US010449882B2

(12) United States Patent
Lev

(10) Patent No.: US 10,449,882 B2
(45) Date of Patent: Oct. 22, 2019

(54) TRAVEL SLEEPING AIDS

(71) Applicant: Nimrod Lev, Savion (IL)

(72) Inventor: Nimrod Lev, Savion (IL)

( * ) Notice: Subject to any disclaimer, the term of this patent is extended or adjusted under 35 U.S.C. 154(b) by 168 days.

(21) Appl. No.: 15/536,660

(22) PCT Filed: Mar. 22, 2016

(86) PCT No.: PCT/IL2016/050304
§ 371 (c)(1),
(2) Date: Sep. 5, 2017

(87) PCT Pub. No.: WO2016/151578
PCT Pub. Date: Sep. 29, 2016

(65) Prior Publication Data
US 2018/0022250 A1 Jan. 25, 2018

Related U.S. Application Data

(60) Provisional application No. 62/138,406, filed on Mar. 26, 2015.

(51) Int. Cl.
| | |
|---|---|
| *B60N 2/882* | (2018.01) |
| *A47C 7/62* | (2006.01) |
| *A47C 16/00* | (2006.01) |
| *B64D 11/06* | (2006.01) |
| *B60N 2/809* | (2018.01) |
| *B60N 2/838* | (2018.01) |

(Continued)

(52) U.S. Cl.
CPC .............. *B60N 2/882* (2018.02); *A47C 7/386* (2013.01); *A47C 16/00* (2013.01); *B60N 2/809* (2018.02); *B60N 2/838* (2018.02); *B61D 33/005* (2013.01); *B64D 11/0642* (2014.12); *B64D 11/0646* (2014.12); *B64D 11/0647* (2014.12); *B60N 2002/905* (2018.02)

(58) Field of Classification Search
CPC ................................ A47C 7/383; B60N 2/882
See application file for complete search history.

(56) References Cited

U.S. PATENT DOCUMENTS 6,805,403 B2 * 10/2004 Buch .................. B60N 3/00
297/146
8,528,970 B2 * 9/2013 Edalati ................ A47C 20/026
297/163

(Continued)

*Primary Examiner* — Sarah B McPartlin

(57) ABSTRACT

Travel sleeping aids for assisting a seated traveler to sleep in a forward leaning seated position toward a passenger seat in front of the seated traveler, the passenger seat having a headrest. In one implementation, a travel sleeping aid includes a U-shaped head support having a face contoured aperture for supporting the seated traveler's head in a forward leaning seated position and a support structure rotatable with respect to the U-shaped head support between a storage position flush with the U-shaped head support and a head support position generally perpendicular to the U-shaped head support. In another embodiment, a hanging travel sleeping aid includes a generally rectangular shaped head support having a passenger seat headrest pocket for being snugly placed on a passenger seat's headrest in front of a seated traveler and a head support panel for supporting the seated traveler's head in his forward leaning seated position.

11 Claims, 15 Drawing Sheets

(51) Int. Cl.
*B61D 33/00* (2006.01)
*B60N 2/90* (2018.01)

(56) References Cited

U.S. PATENT DOCUMENTS 9,629,468 B1\* 4/2017 McCabe ............ A44B 11/2557
2015/0001905 A1\* 1/2015 Jackow ................. A47C 7/383
297/397

\* cited by examiner

TRAVEL SLEEPING AIDS

FIELD OF THE INVENTION

This invention relates to travel sleeping aids for assisting a seated traveler to sleep in a forward leaning seated position toward a passenger seat in front of the seated traveler.

BACKGROUND OF THE INVENTION

Seated travelers in a wide range of transportation systems including inter alia airplanes, trains, buses, and the like, tend to fall asleep during long journeys. The seating arrangements in most transportation systems do not allow a full horizontal position and therefore the seated passenger has to sleep in a seated position. Many seated travelers complain of bad sleeping posture while sitting and neck pains due to lack of support for their heads.

Travel sleeping aids can be generally classified into two categories: First so-called body worn travel sleeping aids in the form of inflatable travel pillows, non-inflatable travel pillows, head or neck restraining arrangements, and the like. And second, so-called body support travel sleeping aids intended to be supported or suspended from a travel sleeping aid support.

Exemplary body worn travel sleeping aids are disclosed in U.S. Pat. No. 6,230,349 to Silver et al., US Patent Application Publication No. US 2013/0125312 A1 entitled Combined Travel Neck Pillow with an Attached Hood Assembly, and US Patent Application Publication No. US 2014/0310877 A1 entitled Travel Pillow with Lateral and Rear Support Bar and a Flat and Thin Back.

Exemplary body support travel sleeping aids are disclosed in:

U.S. Pat. No. 6,010,192 to King discloses a travel pillow and an alternate embodiment with mounting brackets for attachment to a car seat.

U.S. Pat. No. 6,684,431 to Splane, Jr. discloses an angle adjustable tabletop personal support apparatus.

U.S. Pat. No. 7,364,129 to Levari, Jr. discloses a collapsible stand to be placed on a horizontal support surface.

U.S. Pat. No. 7,748,064 to Hamilton diseases a personal seated resting support for supporting portions of a resting person in a forward leaning seated position.

U.S. Pat. No. 8,011,731 to Goddu discloses a collapsible tabletop head cradle for seated users.

U.S. Pat. No. 8,528,978 to Edalati et al. discloses three embodiments of a multi-adjustable body rest apparatus. FIG. 1 shows a body rest apparatus built-in to the back of a passenger seat. FIGS. 2 and 3 show a body rest apparatus for placing on an open foldout table built in to the back of a passenger seat. FIGS. 4 and 5 show a body rest apparatus for hooking onto the headrest of a passenger seat.

U.S. Pat. No. 8,528,978 to Purpura et al. discloses a transport vehicle back seat with integrated upright sleep support system.

U.S. Pat. No. 8,985,693 to Purpura et al. discloses a transport vehicle upright sleep support system.

U.S. Pat. No. 9,150,130 to Jackow discloses a portable head rest.

SUMMARY OF THE INVENTION

In a first aspect of the present invention, there is provided a travel sleeping aid for assisting a seated traveler to sleep in a forward leaning seated position toward a passenger seat in front of the seated traveler, the passenger seat having a headrest, the travel sleeping aid including:

(a) a U-shaped head support having a leading edge remote from the seated traveler, a trailing edge adjacent the seated traveler, and a face contoured aperture with an aperture opening formed in the trailing edge for supporting the seated traveler's head in the forward leaning seated position toward the passenger seat;

(b) a support structure rotatable with respect to the U-shaped head support at the leading edge between a storage position flush with the U-shaped head support and a head support position generally perpendicular to the U-shaped head support, the support structure having a left support arm and a spaced apart right support arm correspondingly terminating at a left end hook and a right end hook rotatable with respect to their respective support arm, and a left fastener and a right fastener for correspondingly fastening the left end hook and the right end hook in one position of i) a first operative position in the direction of the trailing edge and generally parallel to the U-shaped head support for being placed on a generally horizontal support surface for supporting the U-shaped head support in a raised position relative to the generally horizontal support surface, and ii) a second operative position in the direction of the leading edge and generally parallel to the U-shaped head support for being hooked on the passenger seat's headrest facing the seated traveler for suspending the U-shaped head support therefrom; and (c) a locking arrangement for locking the support structure in one position of the storage position and the head support position.

Travel sleeping aids according to the first aspect of the present invention are preferably designed to be stored as a small portable briefcase like items which can be readily deployed in a wide range of transportation systems including inter alia airplanes, trains, buses, and the like, for supporting a seated traveler's head in a natural and convenient manner in a forward leaning seated position. In various embodiments, the U-shaped head supports are designed similar to a massage table face cradle to support at least a seated traveler's head and preferably his cheeks on either side of a face contoured aperture for receiving his nose and mouth to allow a seated traveler to breathe freely in the forward leaning seated position. The U-shaped head supports are designed to stop short of a seated traveler's shoulders or chest such that a seated traveler's head is supported by his head only.

The travel sleeping aids have one of two basic designs as follows: First, an interior support structure is interior mounted with respect to a U-shaped head support such that the U-shaped head support accommodates the interior support structure in its storage position. And second, an exterior support structure is exterior mounted with respect to a U-shaped head support such that the exterior support structure accommodates the U-shaped head support in its storage position.

The travel sleeping aids can be equally deployed suspended from either a passenger seat's headrest in front of a seated traveler or a generally horizontal support surface. The generally horizontal support surface can be, for example, a seated traveler's suitcase placed on his thighs or an open foldout table integral formed in the back of a passenger seat in front of a seated traveler, and the like.

Some travel sleeping aids are provided with an integral non-inflatable or inflatable travel pillow and others are intended for use with a discrete non-inflatable or inflatable travel pillow which can be used separately as a body worn travel sleeping aid. U-shaped head supports can be used as a tray for a book, food and drinks, a laptop computer, and the like. U-shaped head supports can optionally be provided with one or more storage compartments for traveling aids such as eye covers, a toothbrush and toothpaste, a mobile phone, and the like.

In a second aspect of the present invention, there is provided a hanging travel sleeping aid for assisting a seated traveler to sleep in a forward leaning seated position toward a passenger seat in front of the seated traveler, the passenger seat having a headrest, the hanging travel sleeping aid including:

a generally rectangular shaped hanging panel having opposite major edges and opposite minor edges, the opposite minor edges including a leading minor edge and a trailing minor edge, a passenger seat headrest pocket formed at the leading minor edge for being snugly placed on the passenger seat's headrest in front of the seated traveler for suspending the generally rectangular shaped hanging panel therefrom, and a head support panel formed at the trailing minor edge oppositely directed to the passenger seat headrest pocket for supporting the seated traveler's head in his forward leaning seated position on suspending the generally rectangular shaped hanging panel from the passenger seat's headrest in front of the seated traveler.

The hanging travel sleeping aid preferably includes a pair of support panels extending along the opposite major edges for supporting the head support panel. The hanging travel sleeping aid is preferably formed from flexible sheet material and can be readily folded into a small lightweight package for storage purposes. Suitable flexible sheet materials include inter alia fabric, plastic, and the like.

BRIEF DESCRIPTION OF DRAWINGS

In order to understand the invention and to see how it can be carried out in practice, various embodiments will now be described, by way of non-limiting examples only, with reference to the accompanying drawings in which similar parts are likewise numbered, and in which.

DETAILED DESCRIPTION OF DRAWINGS

Figure 1:
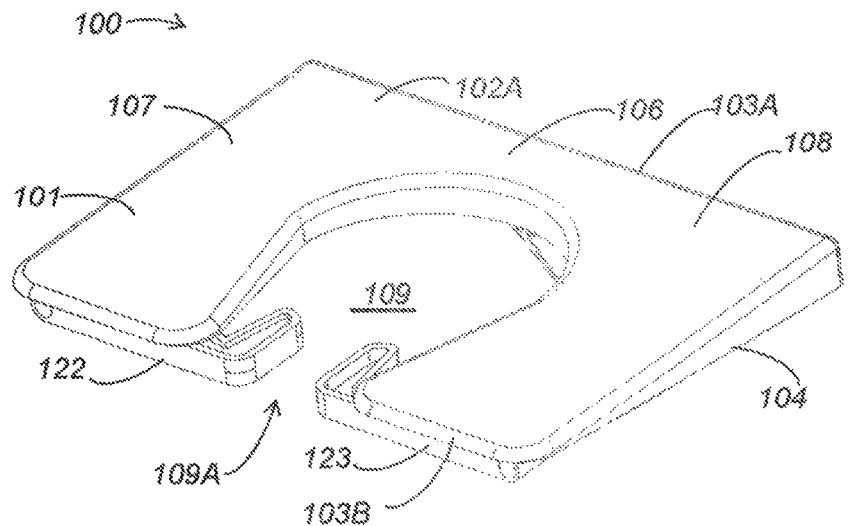
FIG. 1 is a top front perspective view of a first embodiment of a travel sleeping aid in accordance with the present invention in a storage position.
Figure 2:
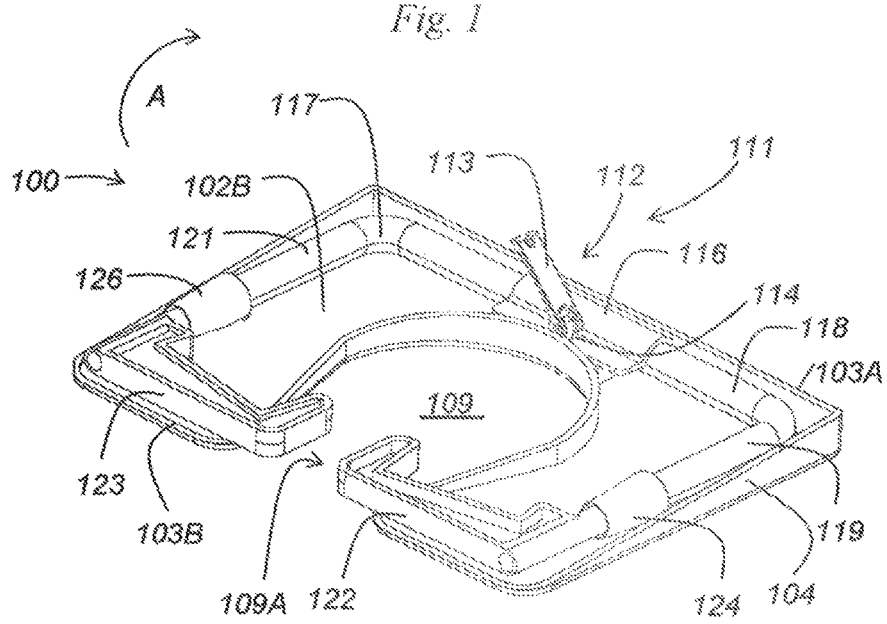
FIG. 2 is a bottom front perspective view of FIG. 1's travel sleeping aid in the storage position.

FIGS. 1 to 7 show a travel sleeping aid 100 for assisting a seated traveler to sleep in a forward leaning seated position toward a passenger seat in front of the seated traveler. The travel sleeping aid 100 includes a U-shaped generally flat head support 101 having a top side 102A, a bottom side 102B, a leading edge 103A remote from a seated traveler, a trailing edge 103B adjacent a seated traveler, and a downward depending rim 104. The U-shaped head support 101 includes a cross piece section 106 and opposite left and right side piece sections 107 and 108 defining a face contoured aperture 109 therebetween. The face contoured aperture 109 has an aperture opening 109A in the trailing edge 103B.

Figure 3:
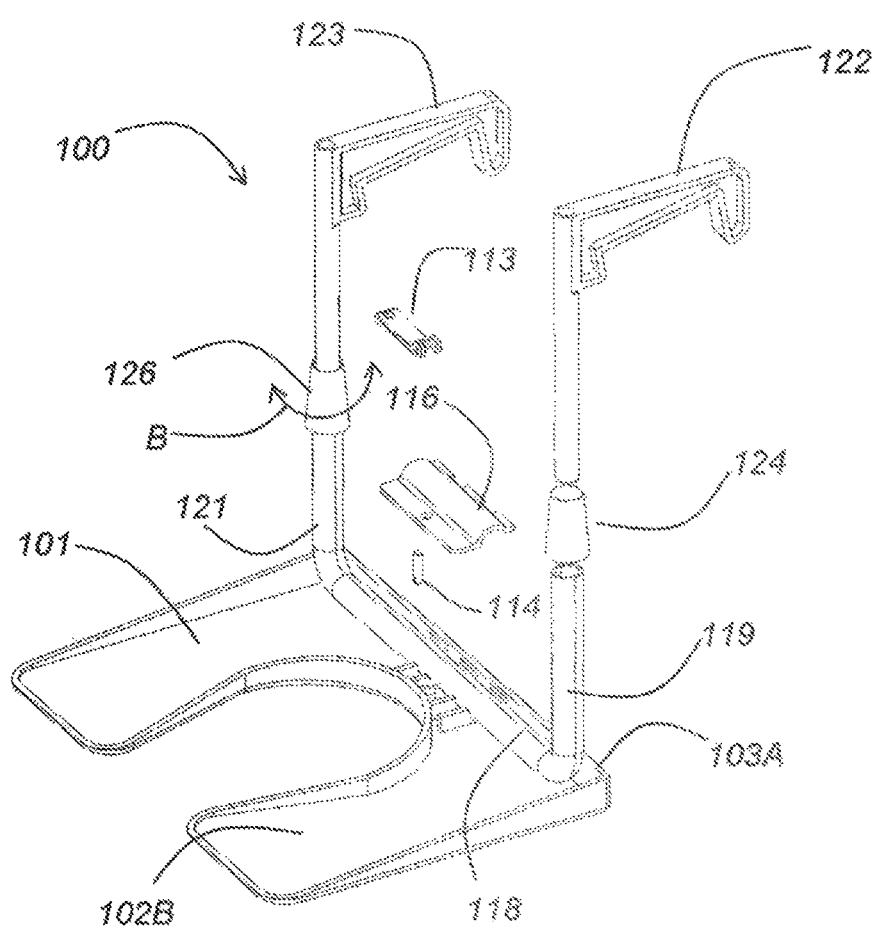
FIG. 3 is a partially exploded view of FIG. 1's travel sleeping aid.

The travel sleeping aid 100 includes an interior support structure 111 mounted inside the U-shaped head support 101 and rotatable with respect thereto at the leading edge 103A through an about a quarter turn in a clockwise direction denoted by arrow A between a storage position flush with the U-shaped head support 101 and a head support position generally perpendicular to the U-shaped head support 101 (see FIG. 3). The U-shaped head support 101 snugly accommodates the interior support structure 111 in the storage position of the interior support structure 111 flush with the U-shaped head support 101.

The travel sleeping aid 100 includes a locking arrangement 112 for locking the interior support structure 111 in one position of the storage position and the head support position. The locking arrangement 112 can preferably lock the interior support structure 111 at additional head support positions subtending different angles with respect to the U-shaped head support 101 thereby for use by seated travelers of different heights, in different travel environments having different seating arrangements, and the like. The locking arrangement 112 includes a manual operated locking arm 113 and a locking pin 114 for applying a compression force to a locking friction plate 116 against the U-shaped head support 101.

The interior support structure 111 includes a U-shaped support 117 having a cross bar 118 and spaced apart left and right support arms 119 and 121. The cross bar 118 is substantially co-extensive with the cross piece section 106. The cross bar 118 is disposed between the locking friction plate 116 and the U-shaped head support 101 such that the locking friction plate 116 locks the cross bar 118 against the U-shaped head support 101 on locking the locking arrangement 112 at any desired angle along the allowed travel range.

The spaced apart left and right support arms 119 and 121 correspondingly have telescopic left and right end hooks 122 and 123. The support arms 119 and 121 correspondingly have left and right fasteners 124 and 126 for correspondingly fastening the spaced apart left and right end hooks 122 and 123 at different lengths from the cross bar 118 and at different rotational orientations with respect thereto denoted by arrow B. The left and right support arms 119 and 121 can be telescopically adjusted such that the left and right end hooks 122 and 123 have a typical height range from about 30 cm to about 60 cm with respect to the U-shaped head support 101.

FIG. 1 shows the travel sleeping aid 100 in its storage position with the interior support structure 111 flush with the U-shaped head support 101 to minimize storage volume. The left and right end hooks 122 and 123 are lacing inwards towards the face contoured aperture 109.

Figure 4:
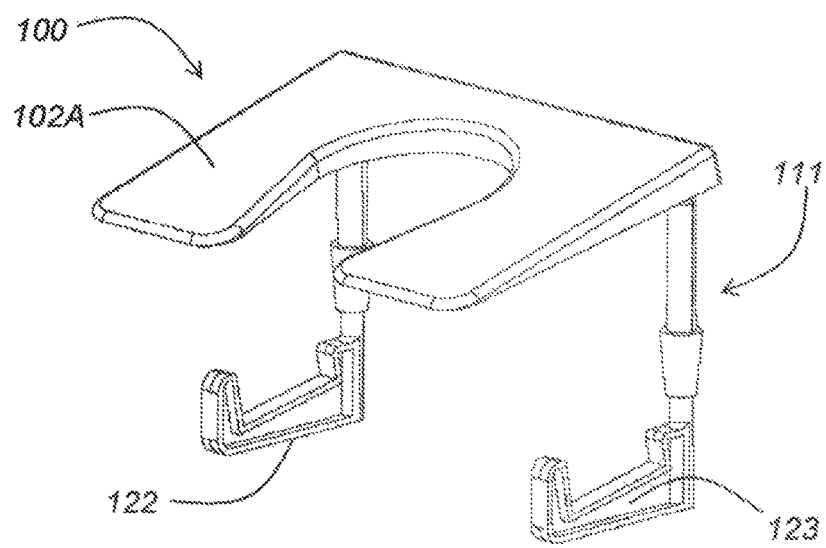
FIG. 4 is a perspective view of FIG. 1's travel sleeping aid deployed for being placed on a horizontal support surface.
Figure 5:
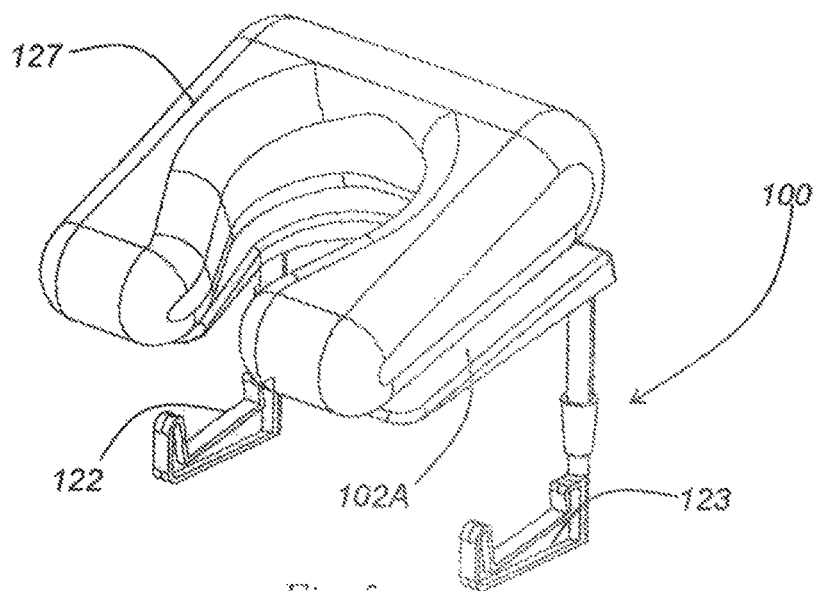
FIG. 5 is a perspective view of FIG. 4's travel sleeping aid with a travel pillow placed on its U-shaped head support.

FIGS. 4 and 5 show the travel sleeping aid 100 with the interior support structure 111 in a first support position on a horizontal support surface, for example, on an open foldout tray of a passenger seat in front of a seated traveler, a briefcase placed on a seated traveler's thighs, and the like. The left and right end hooks 122 and 123 are in the direction of the trailing edge 103B and generally parallel to the U-shaped head support 101 to provide a solid support to the travel sleeping aid 100. FIG. 5 shows a travel pillow 127 placed on the top side 102A.

Figure 6:
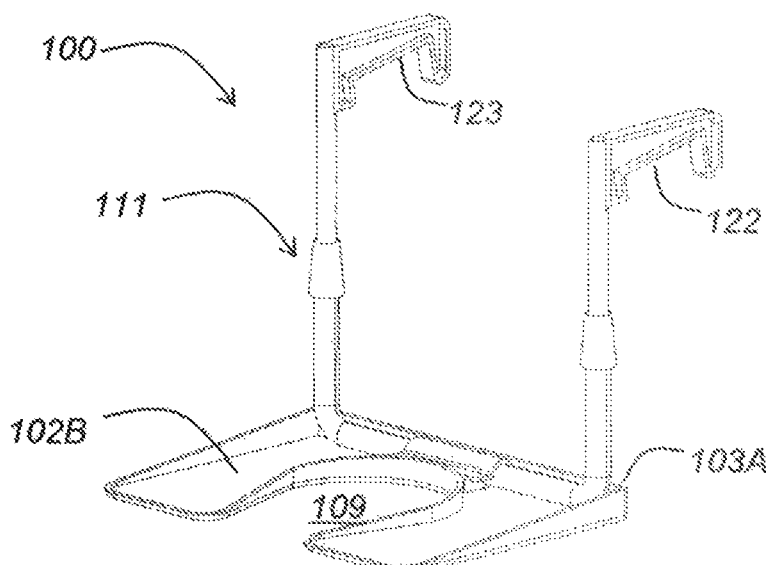
FIG. 6 is a perspective view of FIG. 1's travel sleeping aid deployed for being suspended from a passenger seat in front of a seated traveler.
Figure 7:
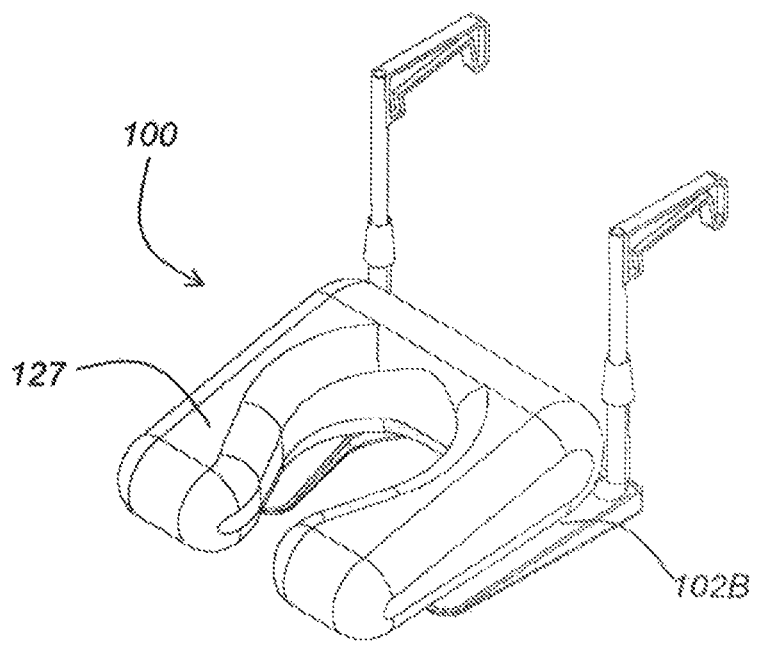
FIG. 7 is a perspective view of FIG. 6's travel sleeping aid with a travel pillow placed on its U-shaped head support.

FIGS. 6 and 7 show the travel sleeping aid 100 with the interior support structure 111 in a second support position for being suspended from a passenger seat in front of a seated traveler. The interior support structure 111 is inverted such that its bottom side 102B is facing upwards. The left and right end hooks 122 and 123 are facing away from a seated traveler in the direction of the leading edge 103A and generally parallel to the U-shaped head support 101 for suspending from the passenger seat's headrest. FIG. 7 shows the travel pillow 127 placed on the bottom side 102B.

The different components of the travel sleeping aid 100 can be constructed from suitable rigid materials including inter alia metal, plastic, rubber and the like. Some components can be formed from one material, for example rubber, and other components, can be formed from a different material, for example, plastic.

Figure 8:
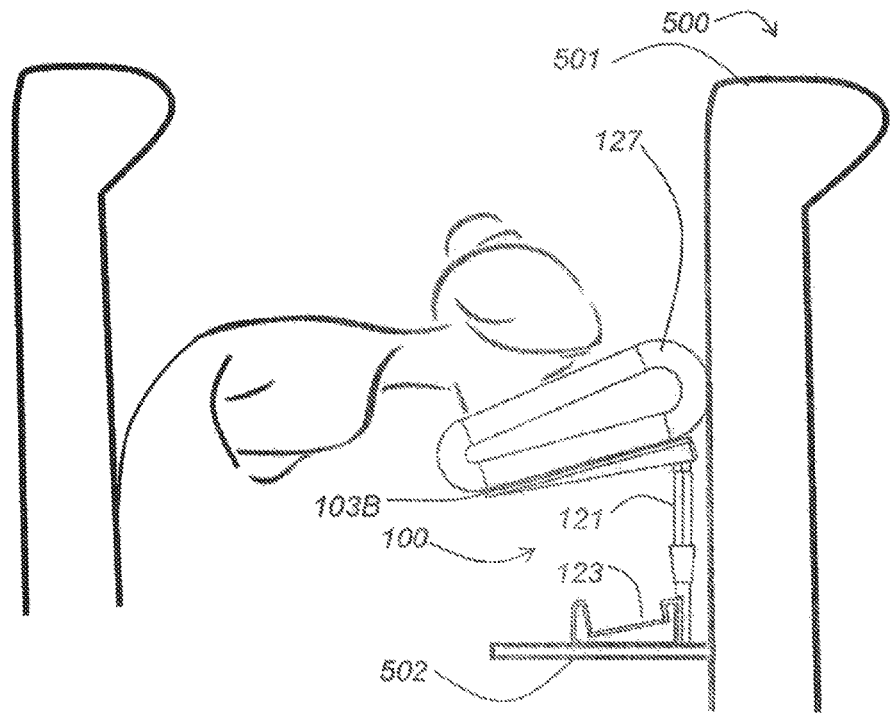
FIG. 8 is a pictorial representation showing a seated traveler sleeping on FIG. 1's travel sleeping aid placed on a horizontal support surface.
Figure 9:
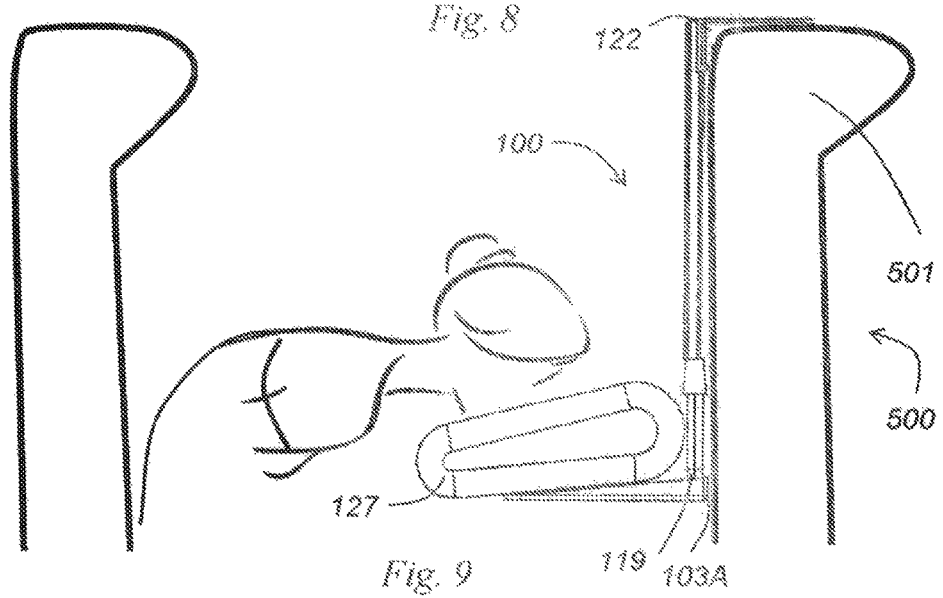
FIG. 9 is a pictorial representation showing a seated traveler sleeping on FIG. 1's travel sleeping aid suspended from a passenger seat's headrest.

FIGS. 8 and 9 show a seated traveler sleeping on the travel sleeping aid 100 supported on a passenger seat 500 in front of the seated traveler. The passenger seat 500 has a headrest 501 and a fold out tray 502. FIG. 8 shows the seated traveler sleeping on the travel sleeping aid 100 mounted on the fold out tray 502 in its folded out position. FIG. 9 shows the seated traveler sleeping on the travel sleeping aid 100 suspended from the headrest 501. FIG. 9 shows that the left and right support arms 119 and 121 are extended to a greater length than in FIG. 8.

Figure 10:
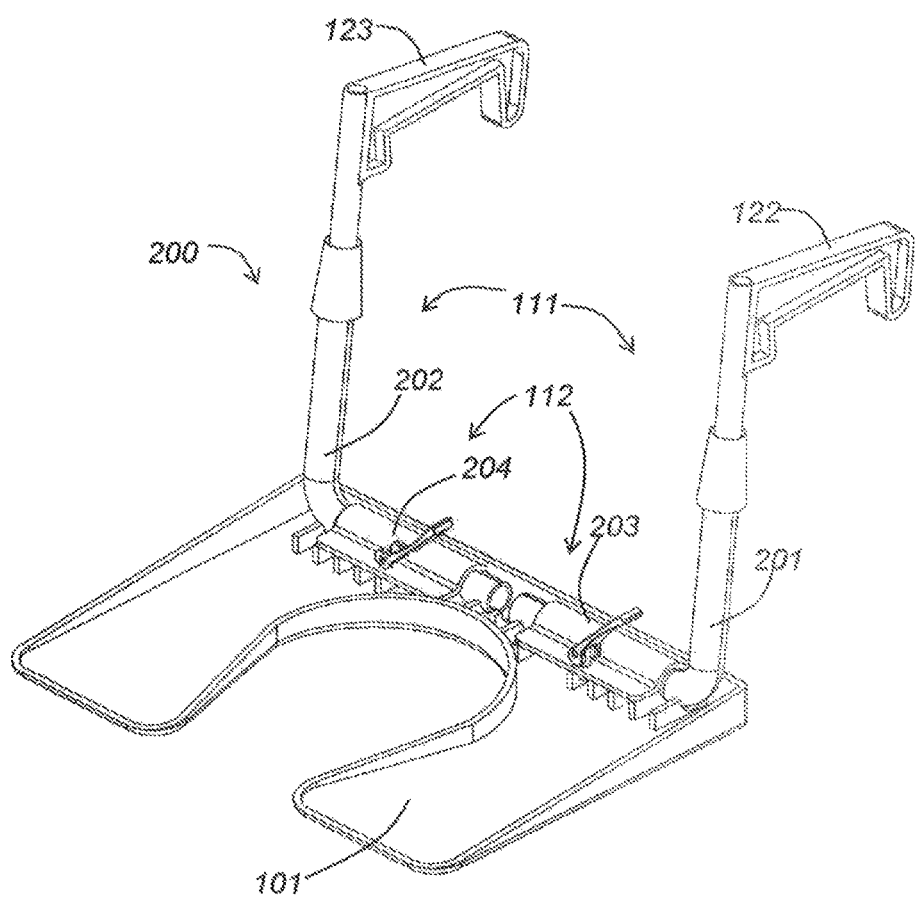
FIG. 10 is a top perspective view of a second embodiment of a travel sleeping aid in accordance with the present invention in a head support position for suspending from a passenger seat in front of a seated traveler.
Figure 11:
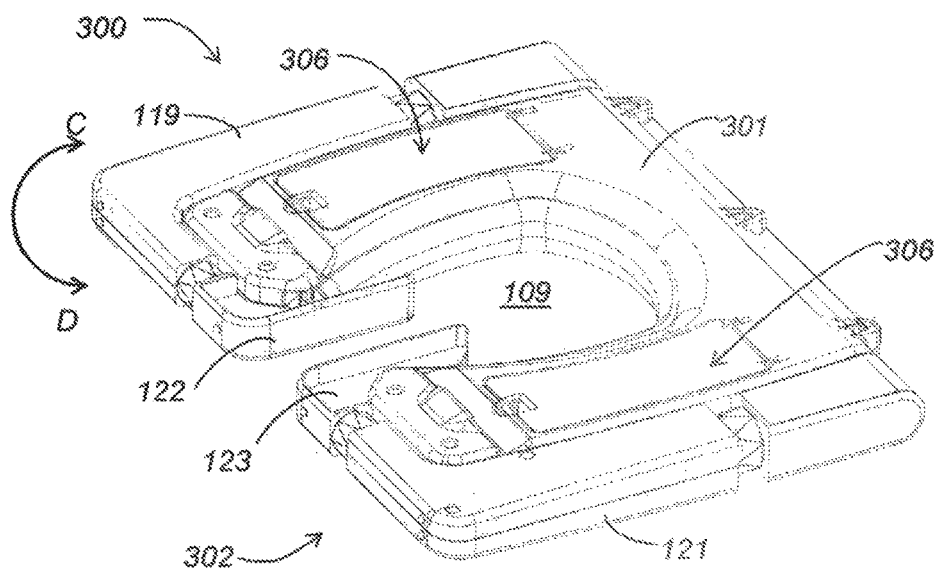
FIG. 11 is a top front perspective view of a third embodiment of a travel sleeping aid in accordance with the present invention in a storage position.
Figure 12:
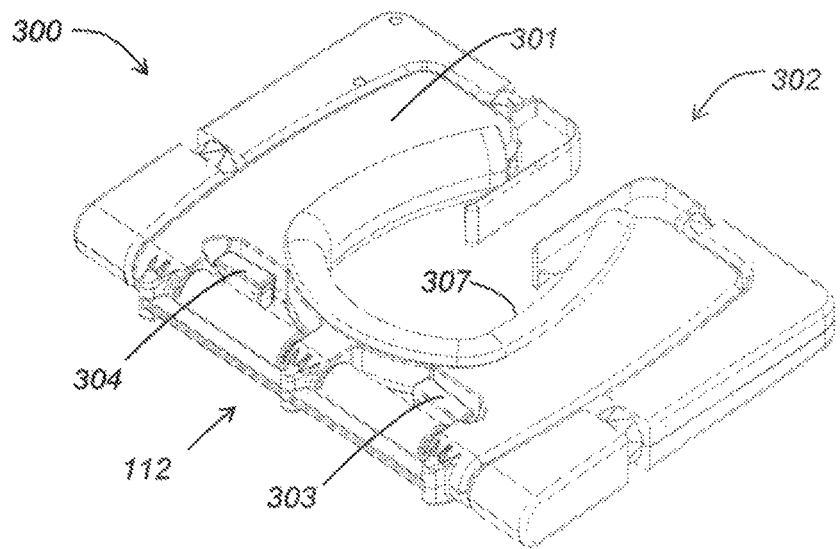
FIG. 12 is a bottom rear perspective view of FIG. 11's travel sleeping aid in a storage position.
Figure 13:
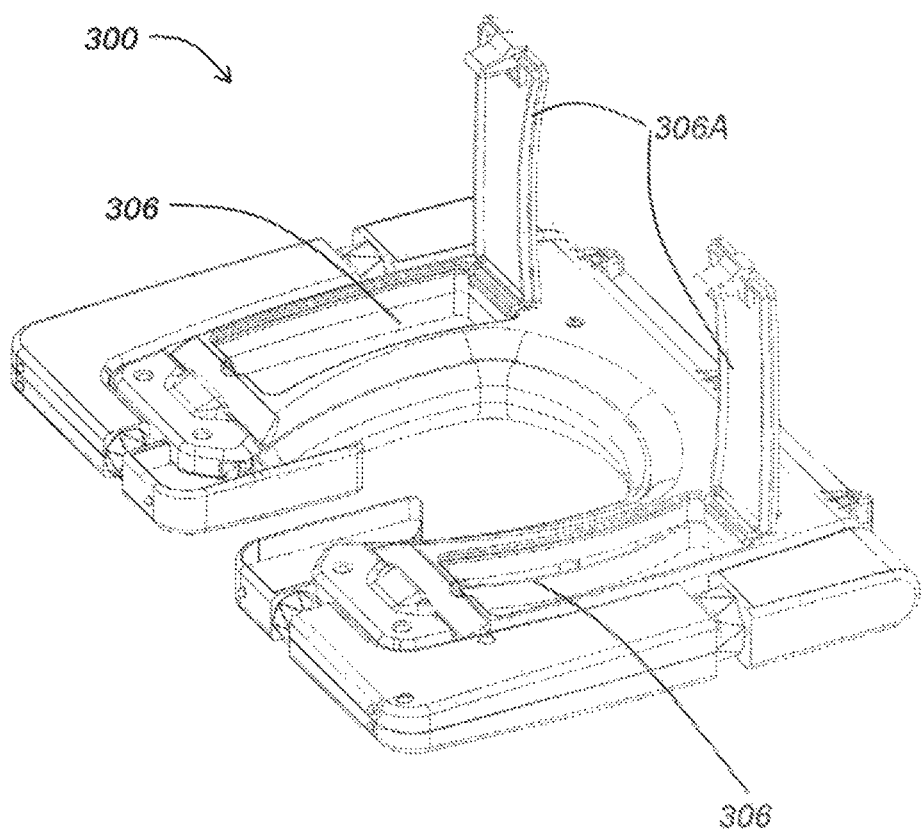
FIG. 13 is a top perspective view of FIG. 11's travel sleeping aid with open storage compartments.
Figure 14:
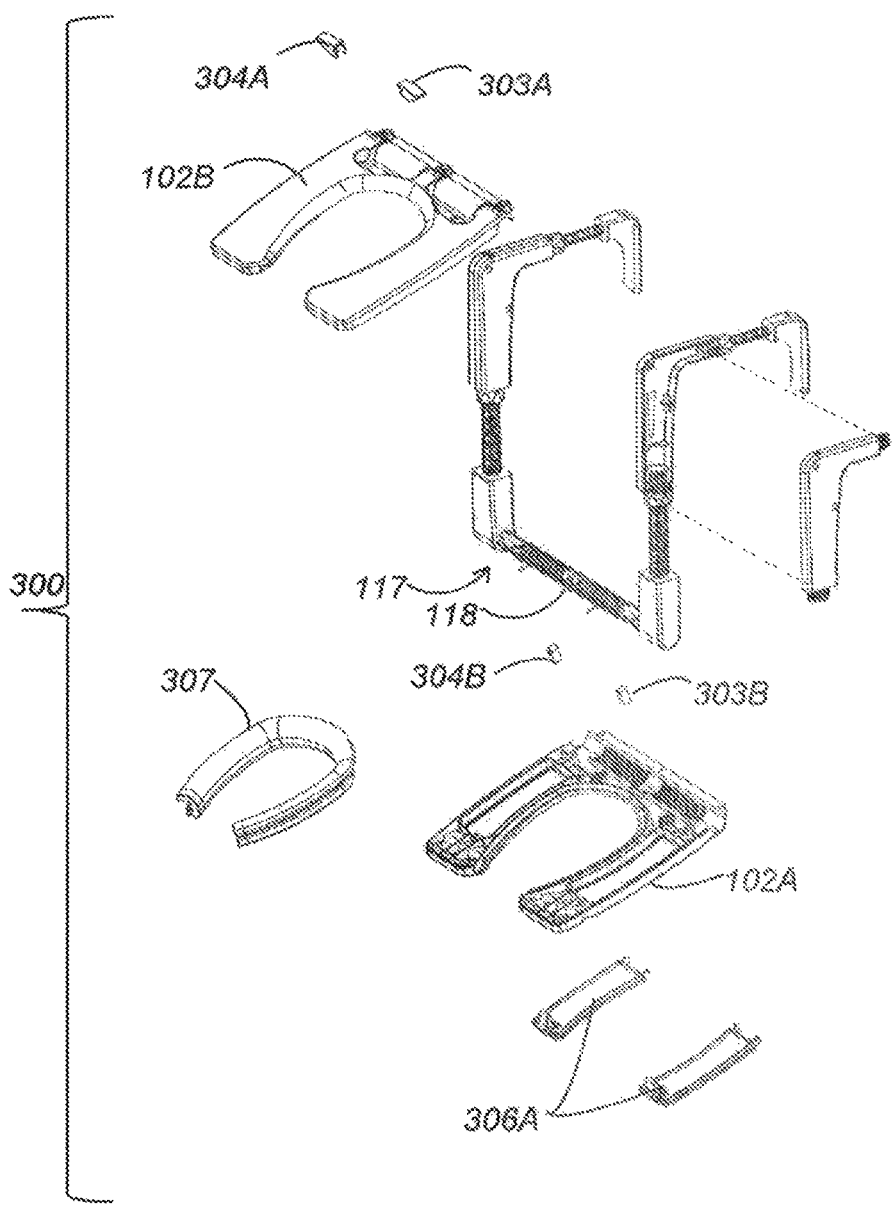
FIG. 14 is a partially exploded view of FIG. 11's travel sleeping aid.

FIG. 10 shows a travel sleeping aid 200 similar in construction and use as the travel sleeping aid 100 and therefore similar parts are likewise numbered. The travel sleeping aid 200 differs from the travel sleeping aid 100 insofar as the travel sleeping aid 200 includes an interior support structure 111 having discrete left and right support arms 201 and 202 and she locking arrangement 112 includes a left lock 203 for locking the left support arm 201 against the U-shaped head support 101 and a right lock 204 for locking the right support arm 202 against the U-shaped head support 101.

FIGS. 11 to 16 show a travel sleeping aid 300 similar in construction and use as the travel sleeping aid 100 and therefore similar parts are likewise numbered. The travel sleeping aid 300 includes a U-shaped head support 301 and an exterior support structure 302 exterior mounted with respect to the U-shaped head support 301 such that the exterior support structure 302 accommodates the U-shaped head support 301 in a storage position of the exterior support structure 302 flush with the U-shaped head support 301.

Figure 15:
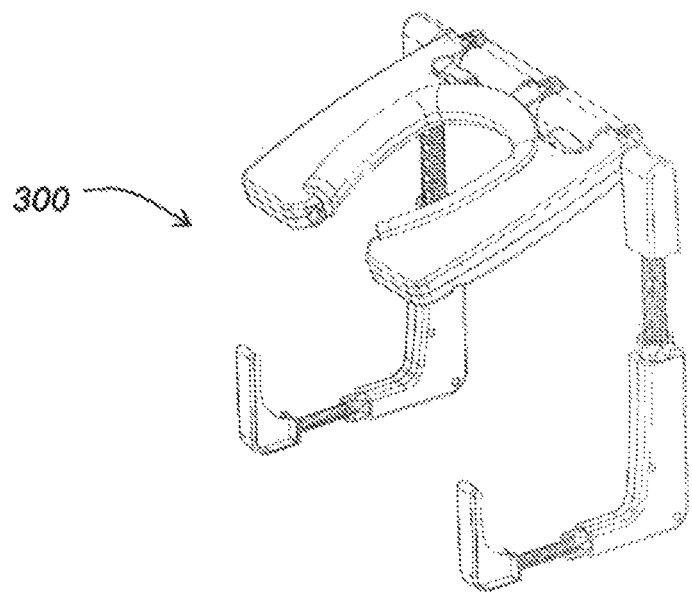
FIG. 15 is a top perspective view of FIG. 11's travel sleeping aid for being placed on a horizontal support surface.
Figure 16:
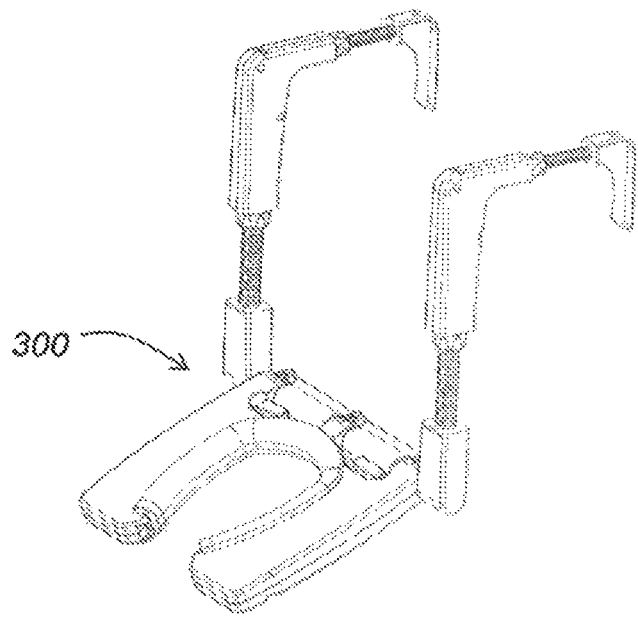
FIG. 16 is a top perspective view of FIG. 11's travel sleeping aid for suspending from a passenger seat in front of a seated traveler.

The exterior support structure 302 is rotatable through at least a quarter turn with respect to a stationary U-shaped head support 301 in either direction of a counterclockwise direction denoted by arrow D for suspending the U-shaped head support 301 from a passenger seat in front of a seated traveler (see FIG. 16) and a clockwise direction denoted by arrow C for being placed on a horizontal support surface for raising the U-shaped head support 301 with respect thereto (see FIG. 15). The exterior support structure 302 is preferably rotatable through a full turn with respect to a stationary U-shaped head support 301.

The travel sleeping aid 300 includes a U-shaped support 117 with a cross bar 118 and a locking arrangement 112 including a left lock 303 and a right lock 304 for correspondingly locking left and right sides of the cross bar 118. The left lock 303 includes a locking arm 303A and a locking pin 303B. The right lock 304 includes a locking arm 304A and a locking pin 304B.

Figure 17:
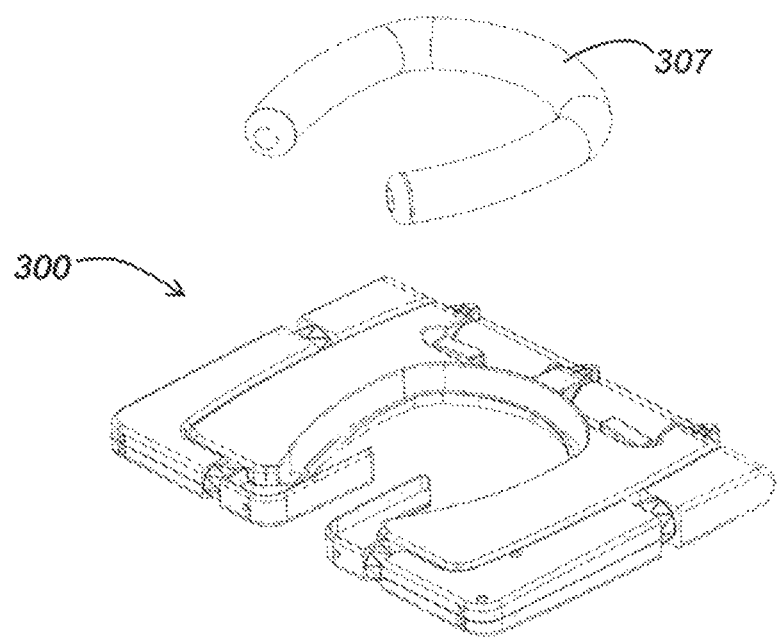
FIG. 17 is a top perspective view of a fourth embodiment of a travel sleeping aid in accordance with the present invention in a storage position.
Figure 18:
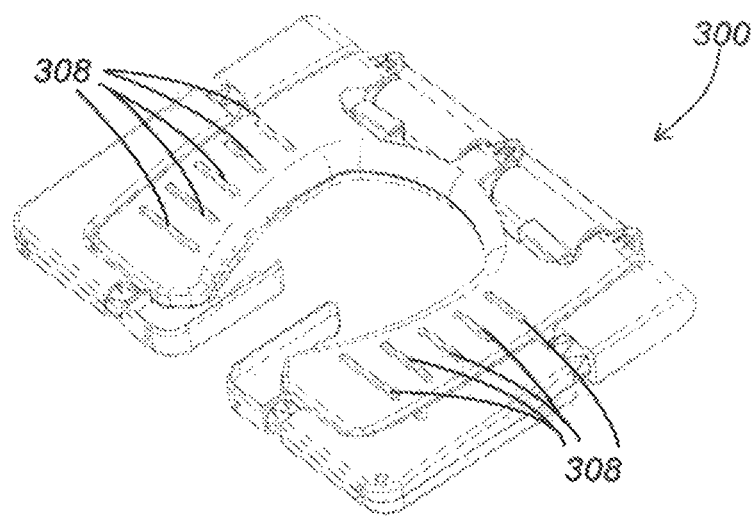
FIG. 18 is a top perspective view of a fifth embodiment of a travel sleeping aid in accordance with the present invention in a storage position.

The U-shaped head support 301 has a dual component box-like construction including a top side 102A spaced apart from a bottom side 102B. The U-shaped head support 101 is preferably formed with at least one storage compartment 306 for storing personal items. The storage compartments 306 preferably have hinged storage compartment lids 306A. The U-shaped head support 301 includes a soft horseshoe shaped lining 307 for lining the face contoured aperture 109. The lining 307 is preferably detachable for cleaning purposes after use (see FIG. 17). The U-shaped head support 301 can optionally include one or more friction elements 308 for non-slip placement of a travel pillow, a laptop computer, and the like thereon (see FIG. 18). Suitable non-friction elements are preferably strip shaped and made of high friction rubber, plastic, and the like.

Figure 19:
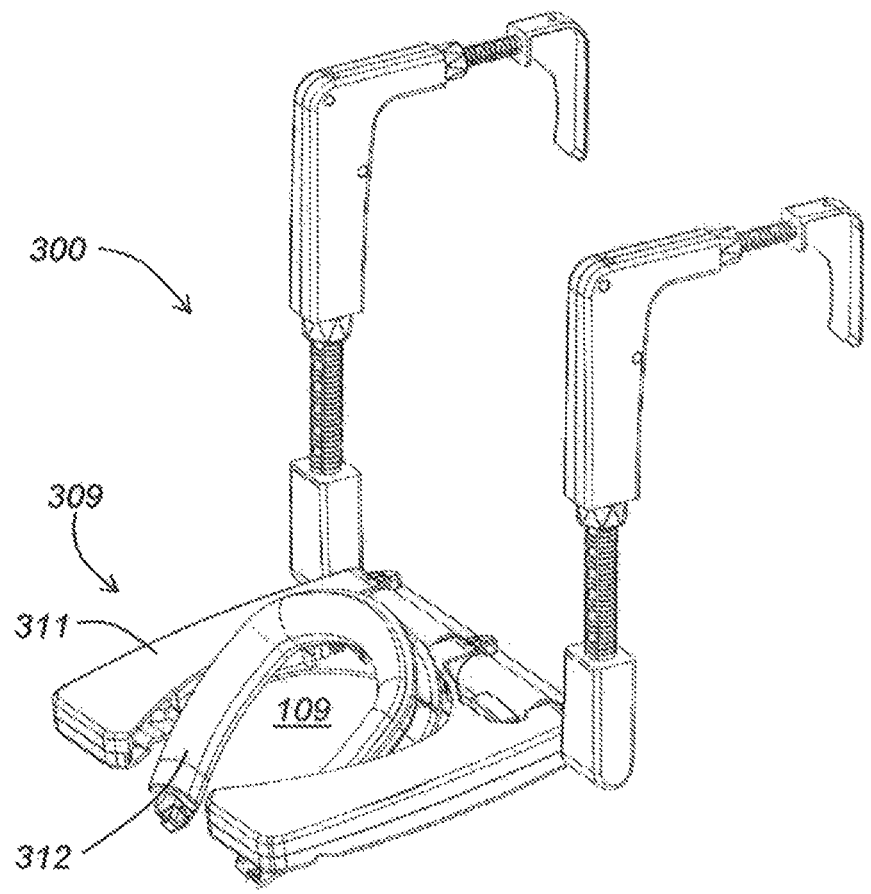
FIG. 19 is a top perspective view of a sixth embodiment of a travel sleeping aid in accordance with the present invention for suspending from a passenger seat in front of a seated traveler.
Figure 20:
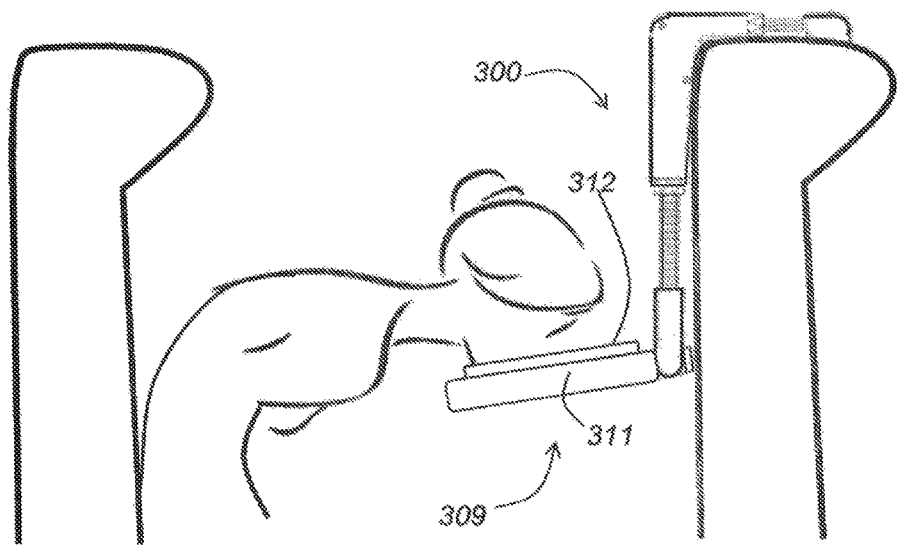
FIG. 20 is a pictorial representation showing a seated traveler sleeping on FIG. 19's travel sleeping aid suspending from an upright passenger seat.
Figure 21:
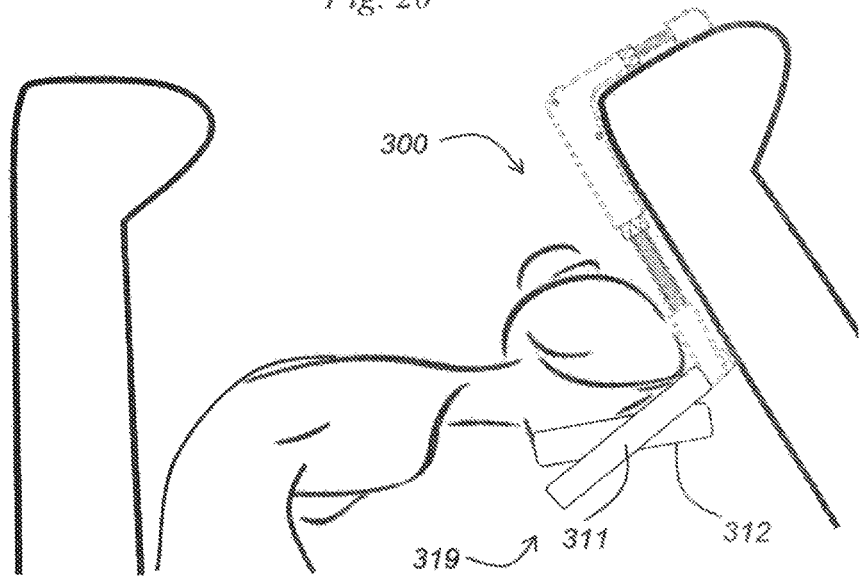
FIG. 21 is a pictorial representation showing a seated traveler sleeping on FIG. 19's travel sleeping aid suspending from an inclined passenger seat.
Figure 22:
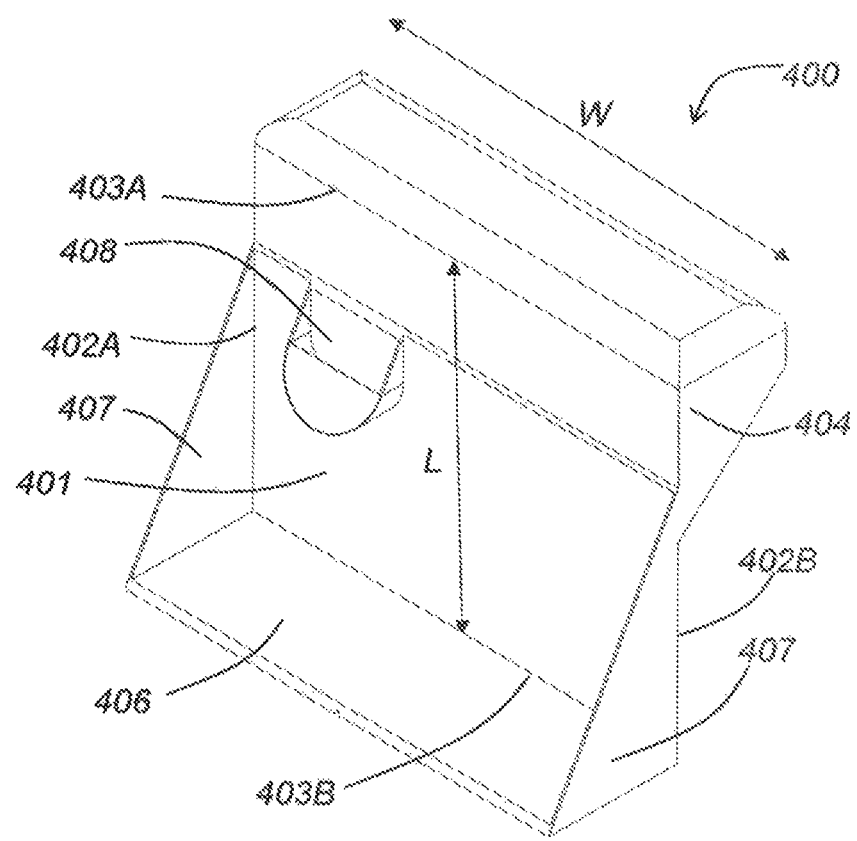
FIG. 22 is a top perspective view of a hanging travel sleeping aid in accordance with the present invention for suspending from a passenger seat in front of a seated traveler.
Figure 23:
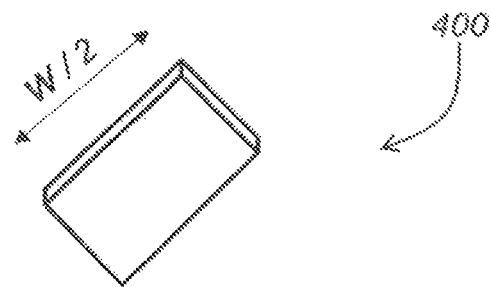
FIG. 23 is a perspective view of FIG. 22's hanging travel sleeping aid in a storage position.
Figure 24:
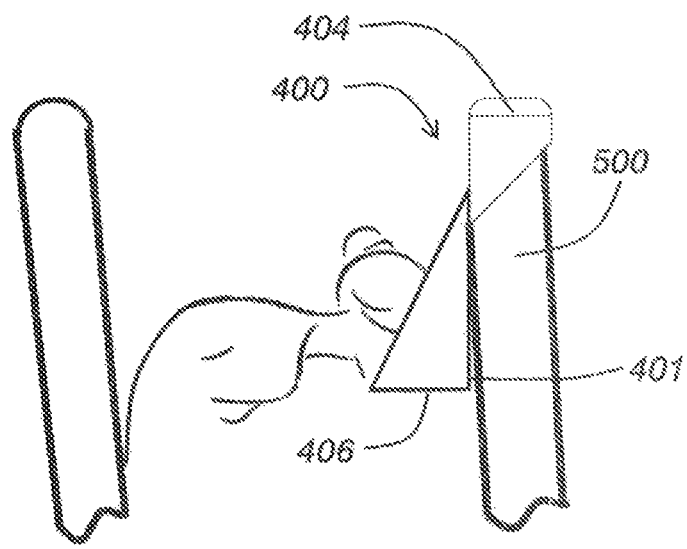
FIG. 24 is a pictorial representation of a seated traveler sleeping on FIG. 22's hanging travel sleeping aid suspended from a passenger seat's headrest.

FIGS. 19 to 21 show the U-shaped head support 301 can optionally have a gimbal construction 309 having a U-shaped surround 311 surrounding a U-shaped mount 312 including the face contoured aperture 109. FIGS. 20 and 21 respectively show a seated traveler sleeping on the travel sleeping aid 300 suspending from an upright passenger seat and an inclined passenger seat. FIG. 21 shows the gimbal construction 300 maintains the seated traveler in a comfortable sleeping position.

FIGS. 22 to 25 show a hanging travel sleeping aid 400 preferably formed from suitable flexible sheet materials, for example, fabric, plastic, and the like. The hanging travel sleeping aid 400 is designed to be readily folded into a small compact lightweight personal item for storage and transportation purposes.

The hanging travel sleeping aid 400 includes a generally rectangular shaped hanging panel 401 having opposite major edges 402A and 402B and opposite minor edges including a leading minor edge 403A and a trailing minor edge 403B. The hanging panel 401 typically has a length L in the range of about 50 to 20 cm and a width W of about 80 cm.

Figure 25:
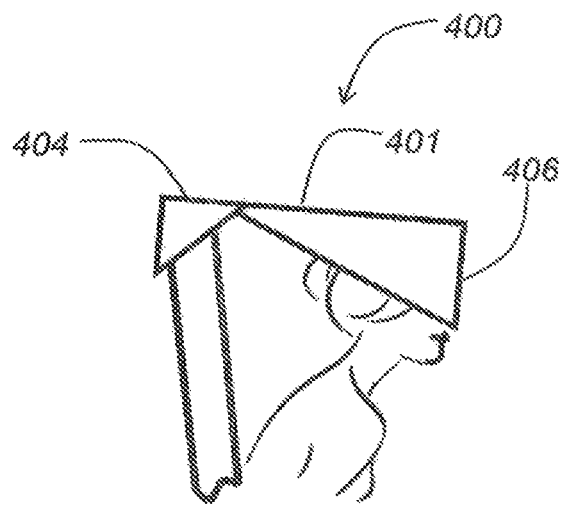
FIG. 25 is a pictorial representation of a seated traveler sleeping on FIG. 22's hanging travel sleeping aid suspended from the seated traveler seat's headrest.

The leading minor edge 403A is formed with a passenger seat headrest pocket 404 for being snugly placed on a passenger seat's headrest in front of the seated traveler for suspending the generally rectangular shaped hanging panel 401 therefrom. The trailing minor edge 403B is formed with a head support panel 406 oppositely directed to the passenger seat headrest pocket 404 for supporting the seated traveler's head in a forward leaning seated position on suspending the generally rectangular shaped hanging panel 401 from the passenger seat's headrest in front of the seated traveler. The hanging travel sleeping aid 400 preferably includes a pair of support panels 407 extending along the opposite major edges 402 for supporting the head support panel 406. The hanging travel sleeping aid preferably includes at least one storage compartment 408 for storing personal items. FIG. 25 shows an alternative deployment of the hanging travel sleeping aid 400 from a seated traveler's own headrest as opposed to the headrest of a passenger seat in front of him. In this instance, the passenger seat headrest pocket 404 has to be turned inside out compared to its FIG. 24's deployment.

While the invention has been described with respect to a limited number of embodiments, it will be appreciated that many variation, modification, and other applications of the invention can be made within the scope of the appended claims.

The invention claimed is:

1. A travel sleeping aid for assisting a seated traveler to sleep in a forward leaning seated position toward a passenger seat in front of the seated traveler, the passenger seat having a headrest, the travel sleeping aid comprising:
    (a) a U-shaped head support having a leading edge remote from the seated traveler, a trailing edge adjacent the seated traveler, and a face contoured aperture with an aperture opening formed in said trailing edge for supporting the seated traveler's head in the forward leaning seated position toward the passenger seat;
    (b) a support structure rotatable with respect to said U-shaped head support at said leading edge between a storage position flush with said U-shaped head support and a head support position generally perpendicular to said U-shaped head support,
        said support structure having a left support arm and a spaced apart right support arm correspondingly terminating at a left end hook and a right end hook rotatable with respect to their respective support arm, and a left fastener and a right fastener for correspondingly fastening said left end hook and said right end hook in one position of
        i) a first operative position in the direction of said trailing edge and generally parallel to said U-shaped head support for being placed on a generally horizontal support surface for supporting said U-shaped head support in a raised position relative to the generally horizontal support surface, and
        ii) a second operative position in the direction of said leading edge and generally parallel to said U-shaped head support for being hooked on the passenger seat's headrest facing the seated traveler for suspending said U-shaped head support therefrom; and
    (c) a locking arrangement for locking said support structure in one position of said storage position and said head support position.

2. The aid according to claim 1 wherein said support structure is an interior support structure mounted inside said U-shaped head support such that said U-shaped head support accommodates said interior support structure in said storage position.

3. The aid according to claim 1 wherein said support structure is an exterior support structure mounted outside said U-shaped head support such that said exterior support structure accommodates said U-shaped head support in said storage position.

4. The aid according to any one of claims 1 to 3 wherein said support structure is rotatable with respect to said U-shaped head support at said leading edge through about a quarter turn in a clockwise direction between said storage position and said head support position such that said U-shaped head support is inverted between said U-shaped head support being suspended from the passenger seat's headrest facing the seated traveler and raised with respect to the horizontal support surface.

5. The aid according to any one of claims 1 to 3 wherein said support structure is rotatable with respect to a stationary U-shaped head support at said leading edge through at least a quarter turn in either direction of a clockwise direction and a counterclockwise direction for suspending said stationary U-shaped head support from the passenger seat in front of the seated traveler and raising said stationary U-shaped support structure with respect to the horizontal support surface.

6. The aid according to any one of claims 1 to 5 wherein said support structure arms are telescopically extendable.

7. The aid according to any one of claims 1 to 6 wherein said support structure includes a U-shaped support bar including a cross bar extending between said spaced apart left and right support arms and said locking arrangement locks said cross bar against said U-shaped head support.

8. The aid according to any one of claims 1 to 6 wherein said support structure includes discrete left and right support arms and said locking arrangement includes a left lock for locking said left support arm against said U-shaped head support and a right lock for locking said right support arm against said U-shaped head support.

9. The aid according to any one of claims 1 to 8 wherein said U-shaped head support includes at least one storage compartment for storage of a personal item.

10. The aid according to any one of claims 1 to 9 wherein said U-shaped head support includes at least one friction element for securing a travel pillow thereon.

11. The aid according to any one of claims 1 to 10 wherein said U-shaped head support has a gimbal construction having a U-shaped surround surrounding a U-shaped mount including said face contoured aperture.

* * * * *